US011489699B2

(12) United States Patent
Silverman et al.

(10) Patent No.: US 11,489,699 B2
(45) Date of Patent: Nov. 1, 2022

(54) CHANNEL ESTIMATION FOR HIGH-SPEED WIRELESS CLIENTS

(71) Applicant: Cisco Technology, Inc., San Jose, CA (US)

(72) Inventors: Matthew Aaron Silverman, Shaker Heights, OH (US); Ardalan Alizadeh, San Jose, CA (US); Jerome Henry, Pittsboro, NC (US); John Matthew Swartz, Lithia, FL (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 17/155,709

(22) Filed: Jan. 22, 2021

(65) Prior Publication Data

US 2022/0239531 A1    Jul. 28, 2022

(51) Int. Cl.
*H04L 25/02*    (2006.01)
*H04W 64/00*    (2009.01)
*H04B 17/318*   (2015.01)
*H04W 80/02*    (2009.01)
*H04W 88/12*    (2009.01)

(52) U.S. Cl.
CPC ....... *H04L 25/0222* (2013.01); *H04B 17/318* (2015.01); *H04W 64/006* (2013.01); *H04W 80/02* (2013.01); *H04W 88/12* (2013.01)

(58) Field of Classification Search
None
See application file for complete search history.

(56) References Cited

U.S. PATENT DOCUMENTS

| 8,264,402 B2 | 9/2012 | Kaiser et al. |
| 10,595,295 B2 | 3/2020 | Henry et al. |
| 10,904,805 B1 * | 1/2021 | Sheriff ................. H04W 36/32 |

(Continued)

FOREIGN PATENT DOCUMENTS

| KR | 20080055363 | 6/2008 | |
| WO | WO-2004086711 A1 * | 10/2004 | ......... H04L 27/2605 |

(Continued)

OTHER PUBLICATIONS

Segev, et al., "Next Generation Positioning Overview and Challenges", Nov. 2014, 28 pages, IEEE.org.
Banin, et al., "High-Accuracy Indoor Geolocation Using Collaborative Time of Arrival", Intel Whitepaper, Sep. 2017, 14 pages, Intel.

(Continued)

*Primary Examiner* — Anh Vu H Ly
(74) *Attorney, Agent, or Firm* — Behmke Innovation Group LLC; Kenneth J. Heywood; Jonathon P. Western (57) ABSTRACT

According to one or more embodiments of the disclosure, a device receives data regarding wireless communications between a wireless access point and a client. The device evaluates, based on the data, motion of the client relative to the wireless access point. The device makes, based on the motion of the client relative to the wireless access point, a determination that the motion of the client relative to the wireless access point will result in the wireless communications degrading as the client approaches the wireless access point. The device adjusts the wireless communications, based on the determination that the motion of the client relative to the wireless access point will result in the wireless communications degrading as the client approaches the wireless access point.

20 Claims, 10 Drawing Sheets

(56) References Cited

U.S. PATENT DOCUMENTS

| | | | |
|---|---|---|---|
| 2013/0188513 A1 | 7/2013 | Vasseur et al. | |
| 2020/0088869 A1 | 3/2020 | Pefkianakis et al. | |
| 2020/0275426 A1 | 8/2020 | Silverman et al. | |
| 2020/0305049 A1* | 9/2020 | Vasseur | H04W 52/40 |
| 2020/0322111 A1* | 10/2020 | Mahajan | H04L 69/324 |
| 2021/0051624 A1* | 2/2021 | Koshy | H04B 17/318 |
| 2021/0211852 A1* | 7/2021 | Ramalho de Oliveira | H04W 4/44 |
| 2022/0052731 A1* | 2/2022 | Legg | H04W 76/15 |
| 2022/0078727 A1* | 3/2022 | Chennichetty | H04L 5/0055 |
| 2022/0086739 A1* | 3/2022 | Da Silva | G01S 13/003 |

FOREIGN PATENT DOCUMENTS

| | | | | |
|---|---|---|---|---|
| WO | WO-2018028892 A1 * | 2/2018 | | H04L 5/0035 |
| WO | WO-2021023819 A1 * | 2/2021 | | A63F 13/235 |
| WO | WO-2021023830 A1 * | 2/2021 | | H04B 7/0695 |
| WO | WO-2021046211 A1 * | 3/2021 | | H04L 27/2602 |

OTHER PUBLICATIONS

Abdullah, et al., "Spatial Diversity for IEEE 802.11p V2V Safety Broadcast in a Highway Environment", Mar. 2010, 16 pages, The Fully Networked Car, Geneva.

Wang, et al. "An Improved Channel Estimation Technique for IEEE 802.11p Standard in Vehicular Communications." Sensors vol. 19,1 98. Dec. 28, 2018, Basel, Switzerland.

Ward, Lisa, "IEEE 802.11ax Technology Introduction", White Paper, Version 01.00, Apr. 2020, 36 pages, Rohde & Schwarz GmbH & Co. KG, Munich, Germany.

Ibrahim, et al., "Verification: Accuracy Evaluation of WiFi Fine Time Measurements on an Open Platform", Session: Where are U Now? Localization and Motion Tracking, MobiCom'18, Oct. 29-Nov. 2, 2018, pp. 417-427, New Delhi, India.

Khorov, et al., "A Tutorial on IEEE 802.11ax High Efficiency WLANs", IEEE Communications Surveys & Tutorials, vol. 21, No. 1, Sep. 2018, pp. 197-216, IEEE.

* cited by examiner

CHANNEL ESTIMATION FOR HIGH-SPEED WIRELESS CLIENTS

TECHNICAL FIELD

The present disclosure relates generally to computer networks, and, more particularly, to channel estimation for high-speed wireless clients.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

With the proliferation of IoT devices to every walk of life, wireless networks are becoming increasingly ubiquitous. As a result, Wi-Fi access points (APs) can now be found in a wide variety of locations. Unfortunately, approaches taken by APs with respect to channel estimation typically operate under the assumption that a joining client is moving at a relatively slow speed. In the real world, however, there are many types of wireless clients that are moving at a very high speed, such as trains, automobiles, and the like. For these types of clients, a contradiction exists where the data link with the AP can actually fail, as the client gets closer to the AP.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives data regarding wireless communications between a wireless access point and a client. The device evaluates, based on the data, motion of the client relative to the wireless access point. The device makes, based on the motion of the client relative to the wireless access point, a determination that the motion of the client relative to the wireless access point will result in the wireless communications degrading as the client approaches the wireless access point. The device adjusts the wireless communications, based on the determination that the motion of the client relative to the wireless access point will result in the wireless communications degrading as the client approaches the wireless access point.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
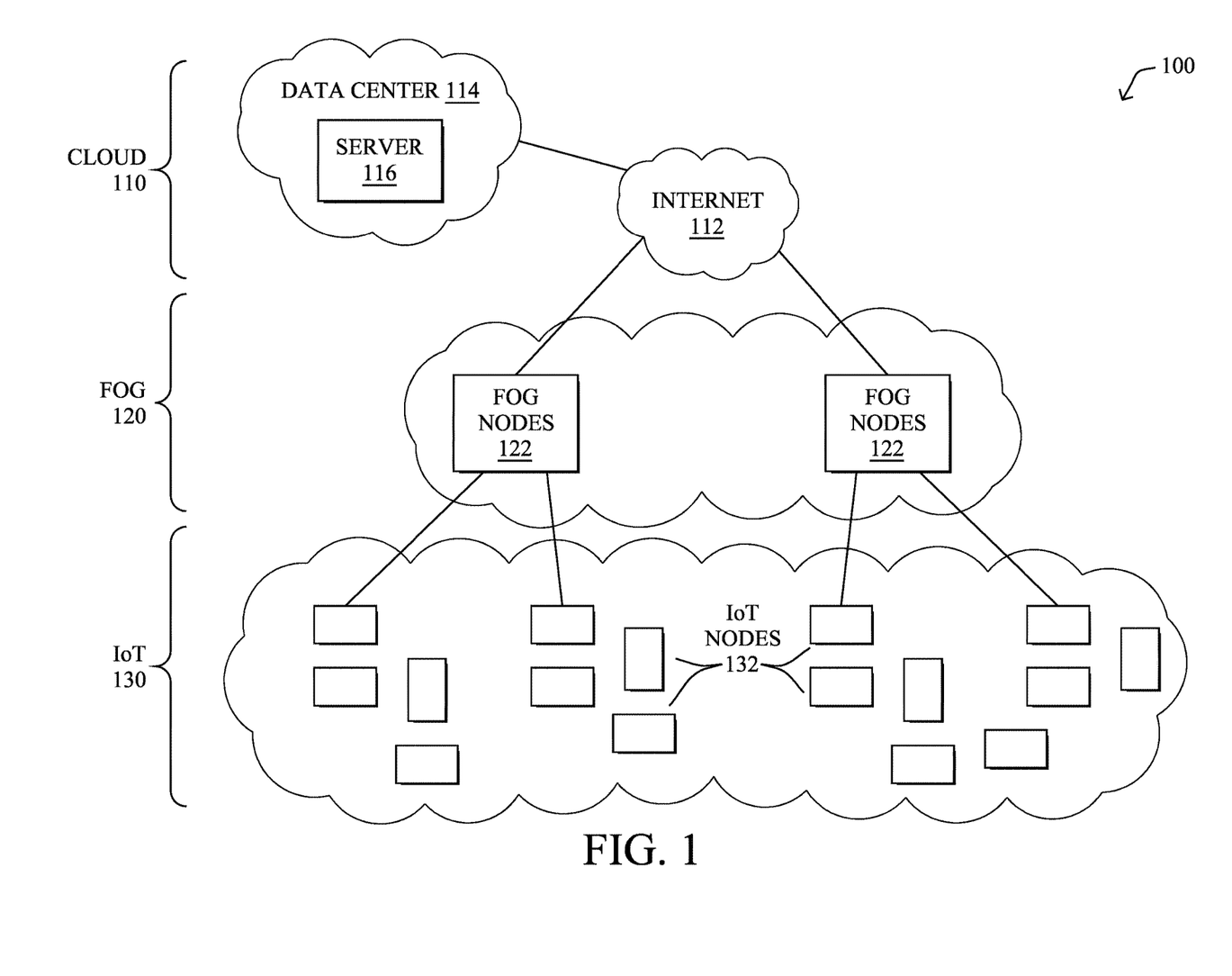
FIG. 1 illustrates an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
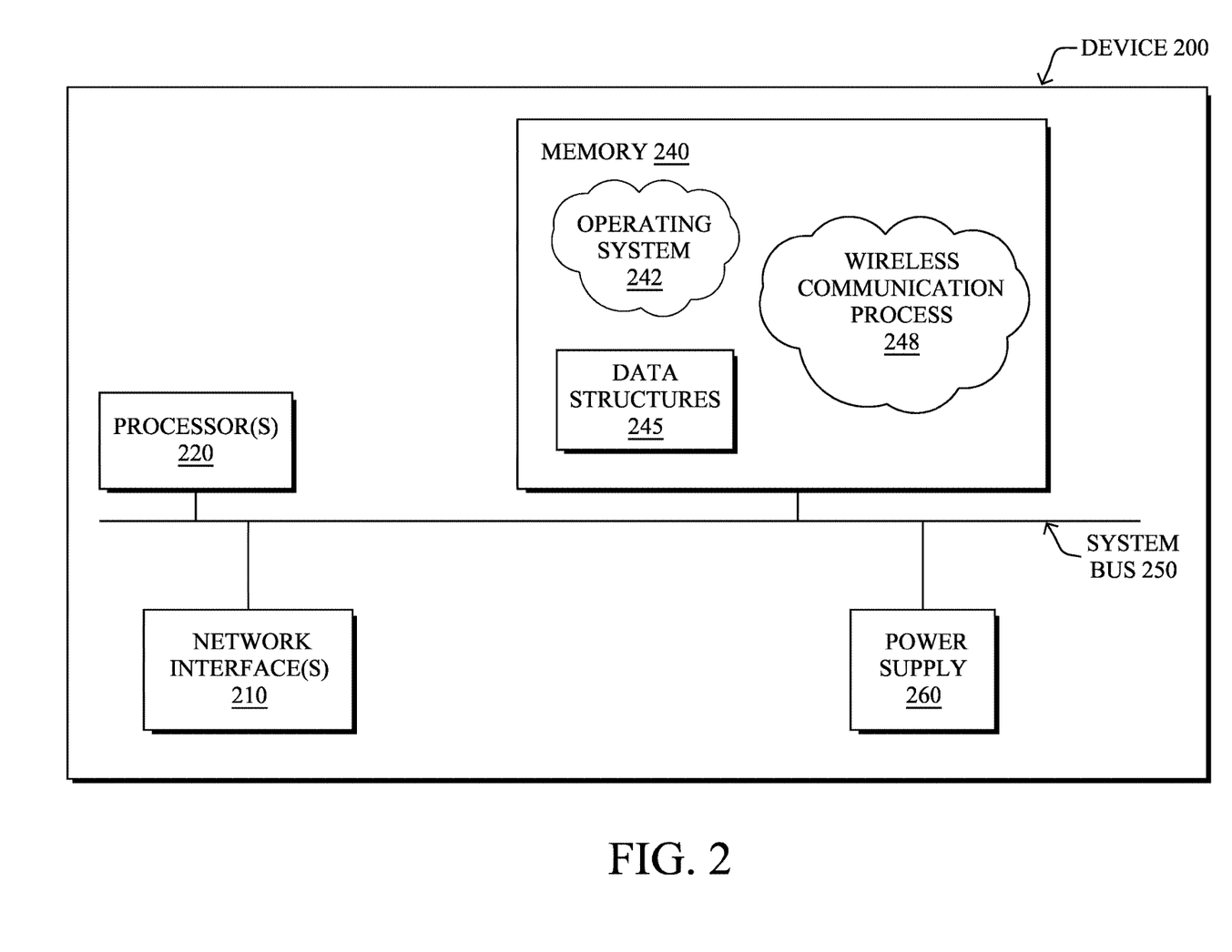
FIG. 2 illustrates an example network device/node.

FIG. 2 is a schematic block diagram of an example node/device 200 that may be used with one or more embodiments described herein. For instance, node/device 200 may take the form of a wireless access point, a controller for a wireless access point, a mobile client, or another device in communication therewith (e.g., a switch, a router, a server, etc.). As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a wireless communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, wireless communication process 248 may be configured to optimize wireless communications between a wireless client and a wireless access point (AP). To do so, in some embodiments, wireless communication process 248 may leverage machine learning techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, wireless communication process 248 may employ one or more supervised, unsupervised, or semi-supervised machine learning models. Generally, supervised learning entails the use of a training set of data, as noted above, that is used to train the model to apply labels to the input data. For example, the training data may include sample metrics or other characteristics of wireless communications. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that wireless communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

As noted above, wireless networks are increasingly communicating with high-speed clients. For instance, such high-speed clients may include, but are not limited to, automobiles, trains, conveyors, lifts, airplanes, drones, and the like. With these types of clients, there is an apparent contradiction whereby the data link with an access point (AP) may actually fail, as the client gets very close to the AP. This is due to the motion of the client resulting in the channel estimates quickly becoming stale. In other words, channel estimates at the beginning of the physical layer protocol data unit (PPDU) are no longer valid by the end of the PPDU.

Figure 3A:
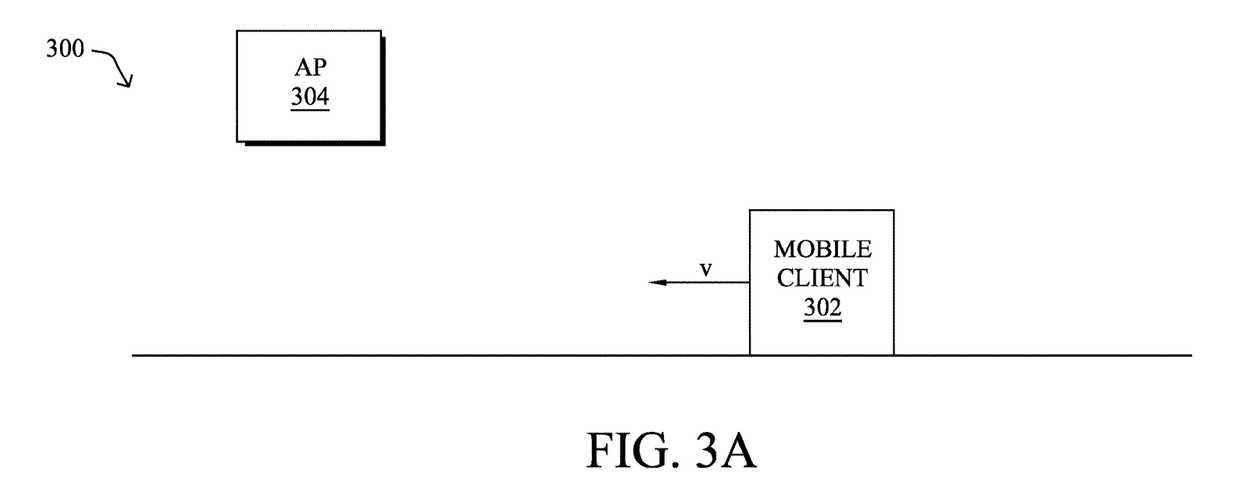
FIGS. 3A-3C illustrate an example of a fast-moving client approaching a wireless access point.
Figure 3B:
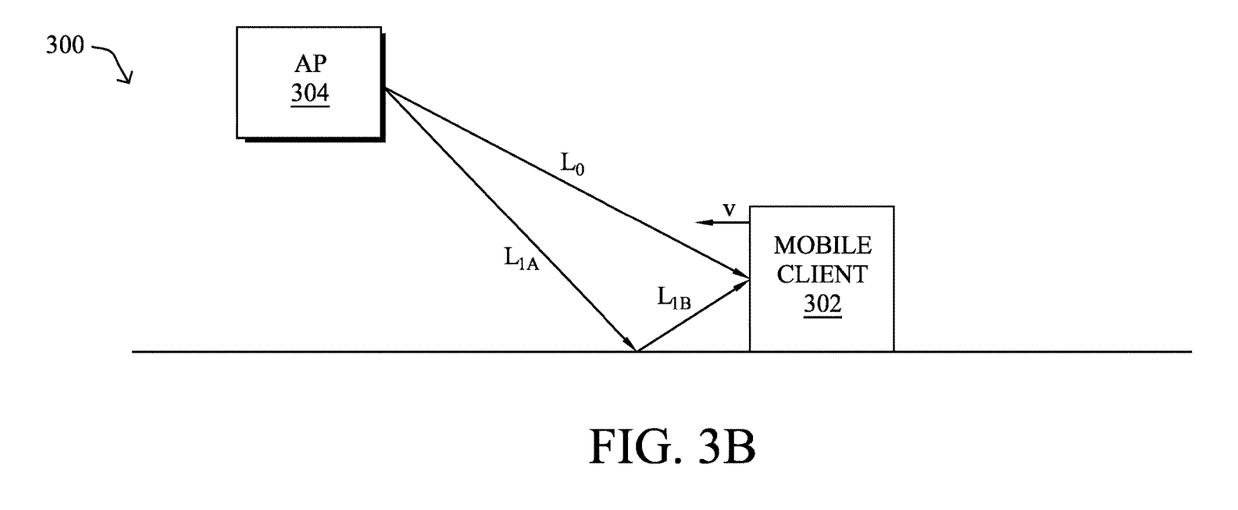
Figure 3C:
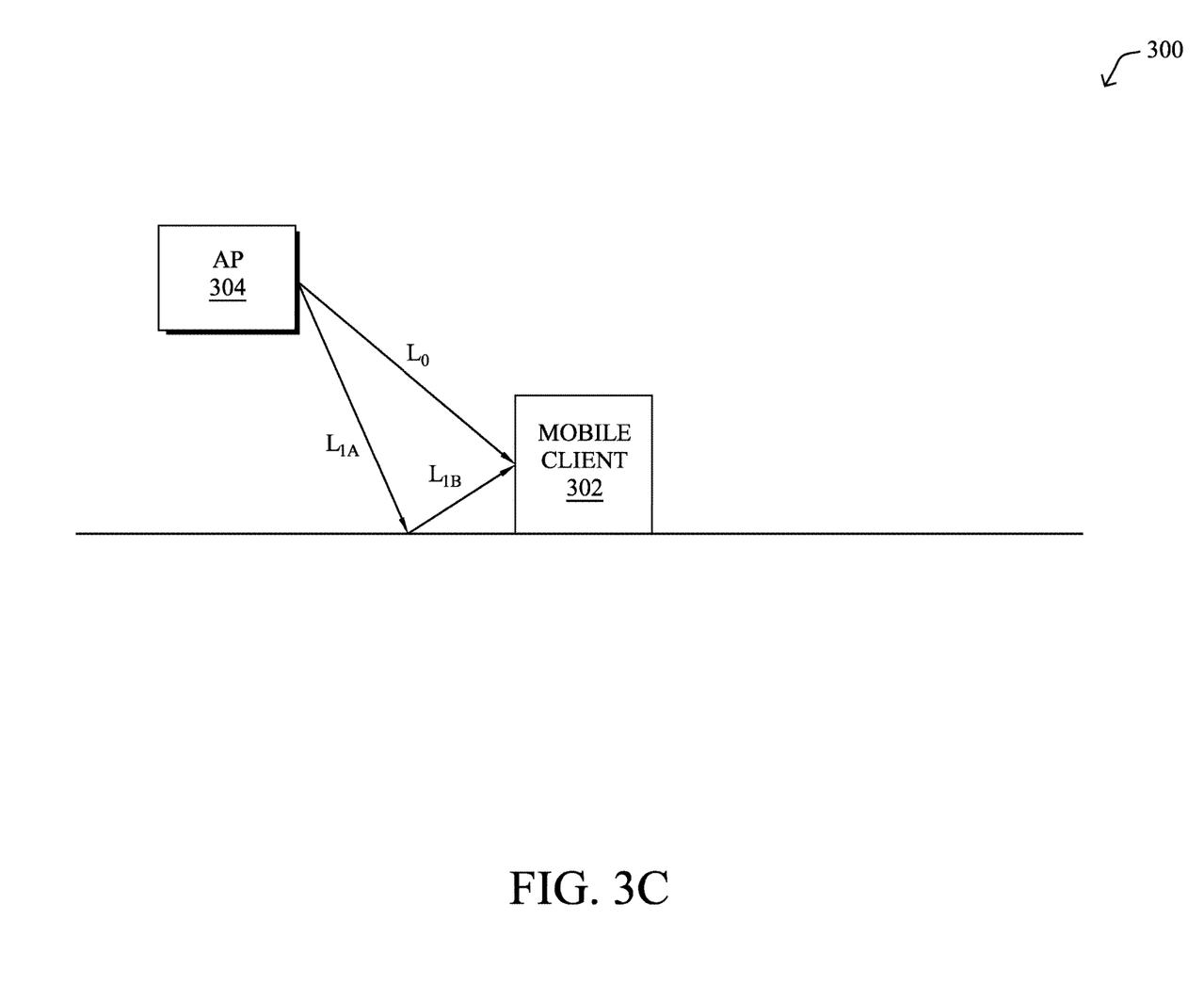

FIGS. 3A-3C illustrate an example 300 of a fast-moving client approaching a wireless access point (AP), in various embodiments. As shown in FIG. 3A, assume that there is a mobile client 302 (e.g., a car, bus, etc.) traveling along the ground in a direction towards AP 304 at a velocity v. Mobile client 302 may be equipped with one or more transceivers configured to communicate with AP 304, wirelessly. For instance, mobile client 302 may comprise a work group bridge (WGB), any number of antennas, associated circuitry, and the like, to form a wireless connection with AP 304.

In cases in which mobile client 302 is far enough away from AP 304, as shown in FIG. 3B, consider the effects of multipath reflections of the signals from AP 304. Indeed, there may be signal reflections off the pathway on which mobile client 302 is traveling (e.g., a roadway, etc.). In cases in which mobile client 302 is far enough away from AP 304, $L_0-(L_{1A}+L_{1B})$ is semi-static over the duration of the PPDU (e.g., between 100 µs and 5 ms).

Now, consider the case illustrated in FIG. 3C in which mobile client 302 is fairly close to AP 302. In this instance, $L_0-(L_{1A}+L_{1B})$ is rapidly changing. In this case, the reflections be on-par with the line of sight path. This results in rapid changes to the multipath channel and will cause the channel estimate to become stale very fast.

Another potential issue that could arise when mobile client 302 is near AP 304 is that the directional antennas of AP 304 may be configured to provide greater range by focusing a beam away from AP 304. When mobile client 302 is close to AP 304, the received signal strength indicator (RSSI) of the $L_0$ path may be very low due to low antenna gain, while the reflective paths have high gain. This can produce inter-symbol-interference (ISI) that also degrades performance. Such a condition is often found in mines, tunnels, and similar locations.

While the Institute of Electrical and Electronic Engineers (IEEE) 802.11ax standard, also known as "Wi-Fi 6," includes some mechanisms that could be used to address rapidly changing channels, deploying them under normal conditions will reduce efficiency. Consequently, many networks do not configure these mechanisms, due to their additional overhead.

Channel Estimation for High-Speed Wireless Clients

The techniques introduced herein help to mitigate the effects of high-speed clients on channel estimates, in an intelligent manner. In some aspects, the techniques herein may assess the movement of a wireless client, to determine whether its movement will result in the wireless communications degrading as the client approaches a wireless access point. If such a situation is likely to occur, the techniques herein may initiate one or more mitigation actions, such as by adjusting the wireless communications between the AP and the wireless client.

Illustratively, the techniques described herein may be performed by hardware, software, and/or firmware, such as in accordance with wireless communication process 248, which may include computer executable instructions executed by the processor 220 (or independent processor of interfaces 210) to perform functions relating to the techniques described herein.

Specifically, according to various embodiments, a device receives data regarding wireless communications between a wireless access point and a client. The device evaluates, based on the data, motion of the client relative to the wireless access point. The device makes, based on the motion of the client relative to the wireless access point, a determination that the motion of the client relative to the wireless access point will result in the wireless communications degrading as the client approaches the wireless access point. The device adjusts the wireless communications, based on the determination that the motion of the client relative to the wireless access point will result in the wireless communications degrading as the client approaches the wireless access point.

Figure 4:
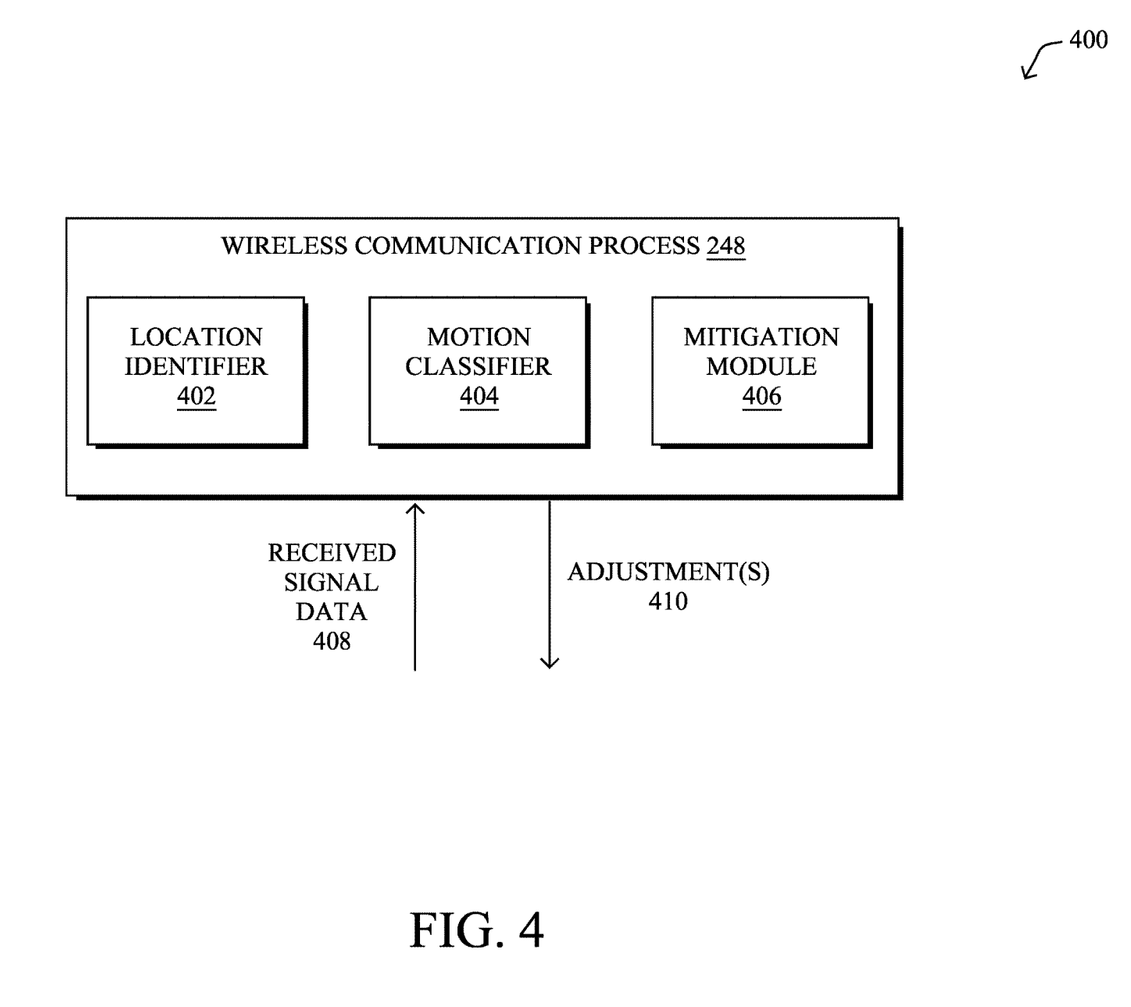
FIG. 4 illustrates an example architecture for a wireless communication process.

Operationally, FIG. 4 illustrates an example architecture 400 for wireless communication process 248, according to various embodiments. As shown, wireless communication process 248 may include any or all of the following components: a location identifier 402, a motion classifier 404, and/or a mitigation module 406. As would be appreciated, the functionalities of these components may be combined or omitted, as desired. In addition, these components may be implemented on a singular device or in a distributed manner. For instance, these components may be executed by an AP, a controller for an AP, another device in communication with an AP, or the like. In the distributed case, the combination of executing devices can be viewed as their own singular device for purposes of wireless communication process 248.

In general, wireless communication process 248 may be configured to identify mobile clients that are susceptible to high losses when near an AP and, in turn, mitigate against these conditions. To do so, as shown, location identifier 402 may assess received signal data 408 regarding the wireless communications between the AP and the mobile client. For instance, received signal data 408 may include RSSI information regarding the signals. In general, it can be assumed that the RSSI will increase, as the mobile client moves from being far away from the AP to closer to the AP. In further embodiments, received signal data 408 may include Fine Time Measurement (FTM) ranging information, that location identifier 402 can use to determine the range between the AP and the mobile client. As would be appreciated, the motion of the client can be determined by assessing its locations over time, as identified by location identifier 402 from received signal data 408.

In various embodiments, wireless communication process 248 may also include motion classifier 404 that is configured to classify the motion of the mobile client. More specifically, motion classifier 404 may be configured to assess the motion information that results from the analysis by location identifier 402, to determine whether the mobile client is likely to experience signal degradation as it approaches an AP. To this end, motion classifier 404 may take into account the current (or most recent) location of the client relative to the AP, as well as its motion of travel (e.g., moving towards the AP, away from the AP, etc.).

In some embodiments, motion classifier 404 may make classify the mobile client based on information specified manually by a user. For instance, a network administrator may flag certain media access control (MAC) addresses or other client identifiers as requiring mitigation due to their motions. Indeed, certain mobile clients may often traverse known paths and/or at known speeds, meaning that their motions are already known and can be easily identified as requiring mitigation for their channel estimates. For instance, a mine cart may traverse a track at a programmed speed and pass a particular AP at defined times throughout the day. In turn, a network administrator may flag the mine cart as needing mitigation for its channel estimates, based on the expertise of the administrator and/or prior issues experienced by the mine cart.

In further embodiments, motion classifier 404 may make its classifications on the fly, so as to accommodate clients that have not been explicitly flagged or are new to the wireless network. In one embodiment, motion classifier 404 may do so by assessing the relationships between the motion of the client relative to the AP, as well as the RSSI rate of change for that client. In a further embodiment, motion classifier 404 may also take into account the paths of travel and, therefore, the target APs for which problems are likely to occur. Such information may be known, for instance, in an IoT environment where the pool of clients is expected to be controlled and clients are often returning to the same AP and traverse the same paths, repeatedly.

To model the signal degradation of a client as it approaches an AP, motion classifier 404 may comprise one or more machine learning or statistical classifiers that are trained using a training dataset of key performance indicators (KPIs) over time, as clients move relative to an AP. For instance, in a Gaussian structure, there should be a correlation between the RSSI of the client and the throughput. This intuitively makes sense, as a higher RSSI value indicates that the client is closer to the AP and, thus, a higher throughput can be achieved between the client and the AP. Standard clients, such as those that are slow moving, will exhibit this type of statistical correlation. However, fast-moving clients that are susceptible to degradation as they approach an AP will exhibit a different correlation, where the throughput/data rate drops suddenly, as the RSSI is still increasing.

Figure 5:
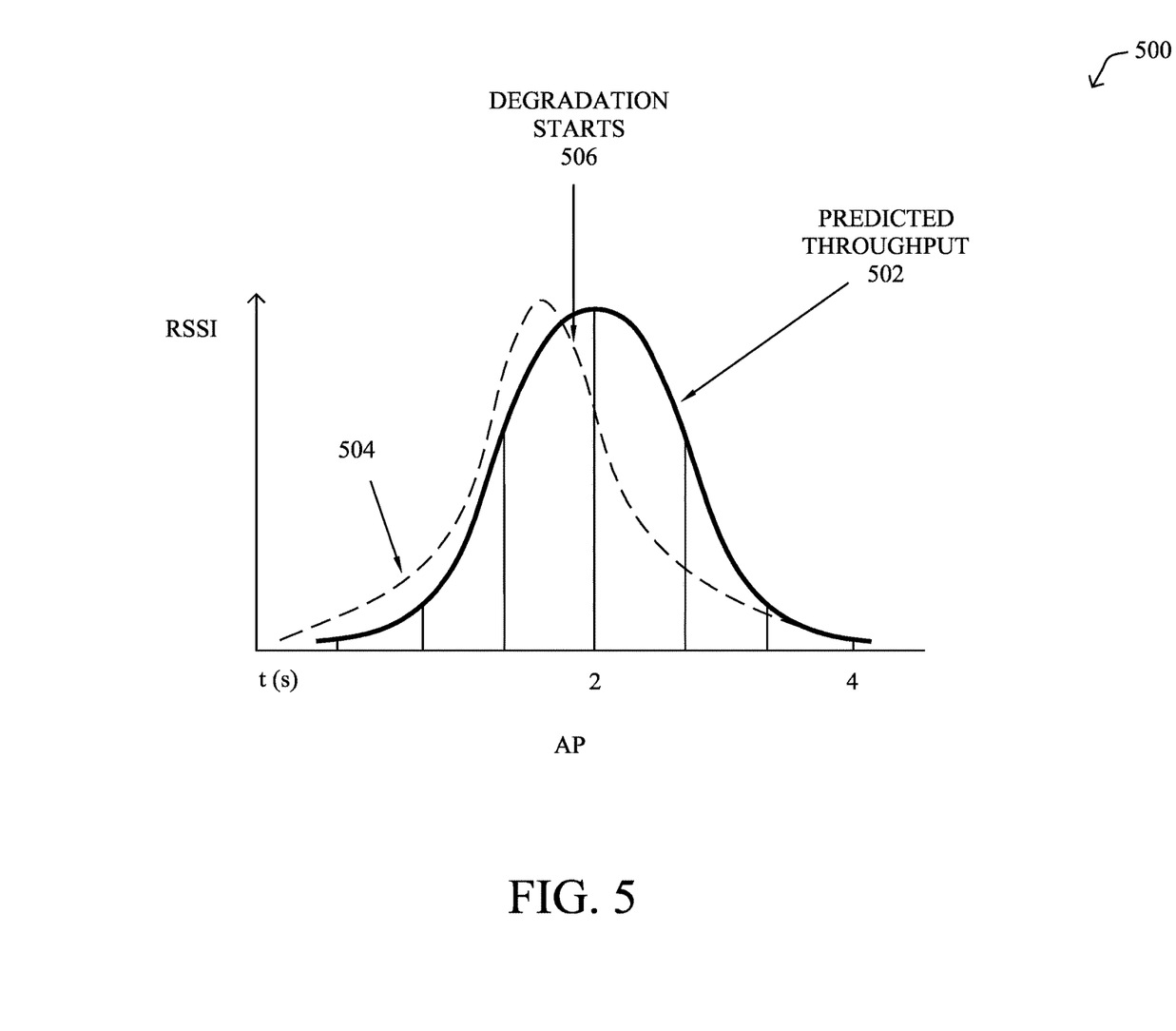
FIG. 5 illustrates an example plot showing the correlation of client received signal strength indicator (RSSI) and throughput.

Plot 500 in FIG. 5 illustrates an example of the degradation to the throughput of a fast-moving client, according to some embodiments. As shown, curve 502 represents the predicted/expected throughput of a client as it passes an AP, which takes on a Gaussian shape with a peak centered at the AP. In other words, it is expected that the RSSI and the throughput of the communications between the AP and the mobile client will be at their maximum, as the client is closest to the AP.

Assume now that the communications with a particular client exhibit the pattern shown in curve 504, instead of the expected curve 502. Here, the throughput degradation begins just prior to when the client is closest to the AP, meaning that the KPIs of the communication drops off sooner than expected. Motion classifier 404 may detect such deviations and flag the mobile client as being susceptible to this condition, accordingly.

FIGS. 6A-6D illustrate example plots that further show the difference between 'normal' client behaviors and the behaviors exhibited by fast-moving clients that are susceptible to channel mis-estimations. As shown in plot 602 in FIG. 6A, normal clients may come within proximity of an AP at a low data rate/modulation and coding scheme (MCS). This will increase as the client gets closer to the AP (temporal point 1). Then, as it moves away from the AP, the signal conditions will degrade (e.g., signal level, etc.), and so does its MCS.

Figure 6A:
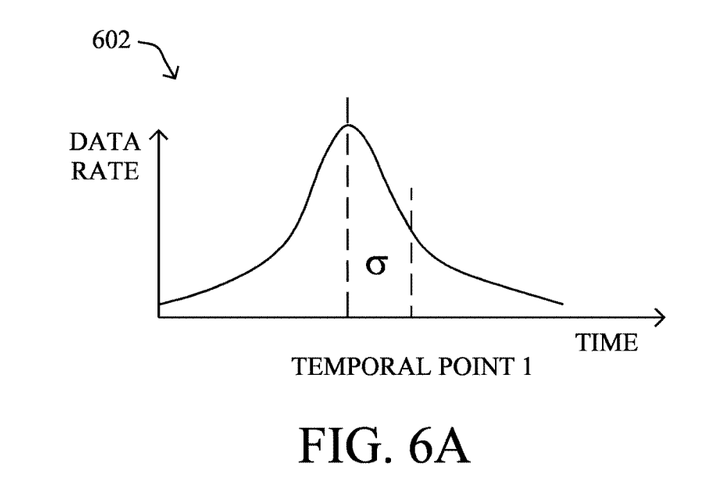
FIGS. 6A-6D illustrate example plots of different wireless communication patterns.
Figure 6B:
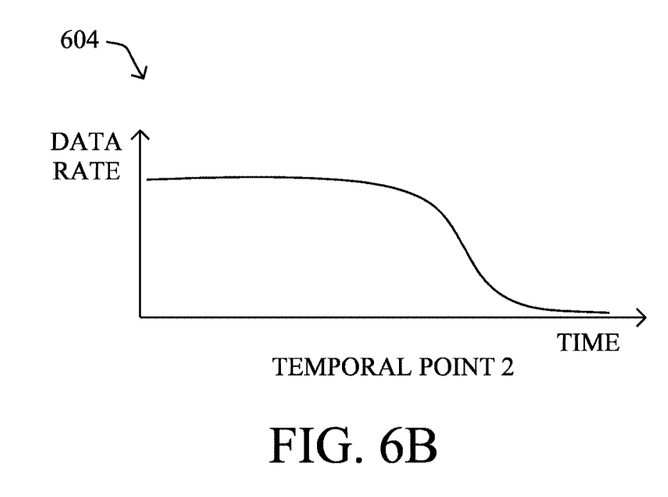

In contrast to plot 602, plot 604 in FIG. 6B shows how the communications with an affected client may behave. Here, the client may also come into proximity of the AP at a low data rate/MCS. However, since the client is moving at a high velocity, there is little time available to increase the MCS before degradation of the data rate begins (temporal point 2). Thus, the data rate may exhibit a relatively flat pattern until the degradation begins.

Figure 6C:
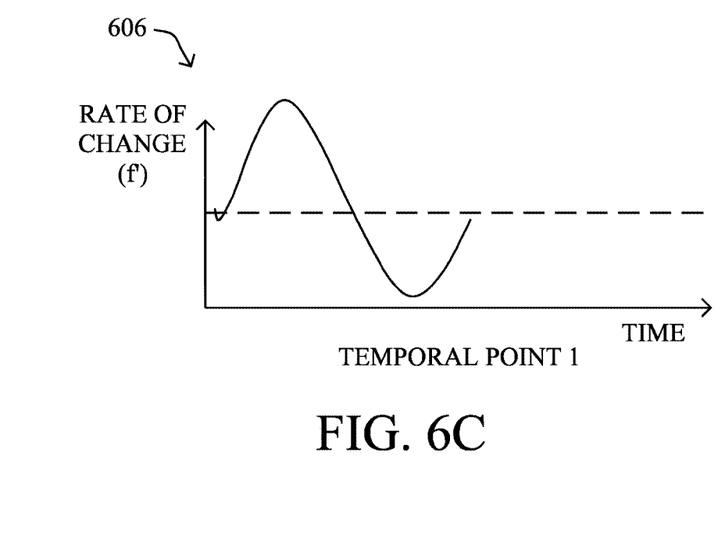
Figure 6D:
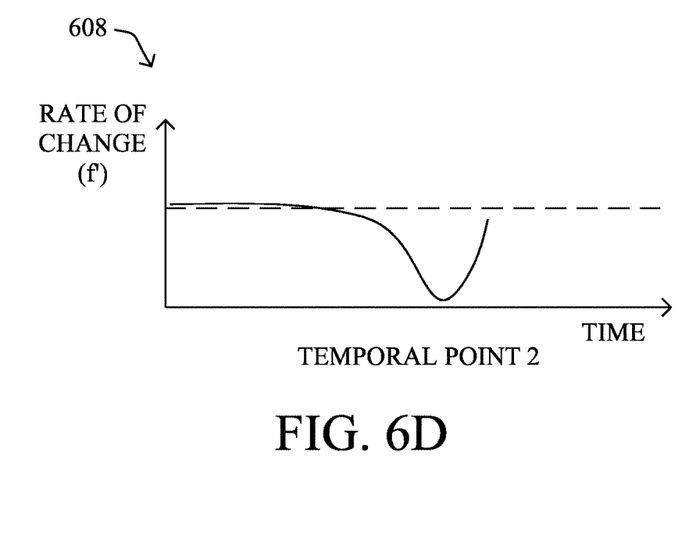

The contrast between the two behavioral patterns in FIGS. 6A-6B is even more profound when assessing the first derivatives of these plots. For instance, plot 606 in FIG. 6C shows the first derivative of plot 602 from FIG. 6A, which takes on a sinusoidal shape. In contrast, plot 608 in FIG. 6D shows the first derivative of plot 604 from FIG. 6B, which takes on a very different shape than that of plot 606 in FIG. 6C. Accordingly, motion classifier 404 may assess the $n^{th}$ derivative(s) of the KPI(s) associated with a mobile client, in some embodiments, to identify behaviors that differ from the normal, expected behavior and may be susceptible to degraded performance as it approaches the AP.

Referring again to FIG. 4, once motion classifier 404 has determined that the communications between a client and an AP will degrade as the client approaches the AP, it may trigger mitigation module 406 to adjust the communications, according to various embodiments. In turn, mitigation module 406 may generate one or more adjustments 410 for the communication, that are configured to mediate against the degradation condition. Depending on the identity of the device executing wireless communication process 248, mitigation module 406 may send adjustment(s) 410 locally and/or to another device. For instance, mitigation module 406 may send adjustments 410 to the AP and/or to the mobile client, in some instances.

In one embodiment, adjustment 410 may cause the AP to switch to a mode where aggregated media access control protocol data unit (AMPDU) aggregation or aggregated media access control service data unit (AMSDU) is limited. For instance, as the client enters a particular cell or zone, mitigation module 406 may trigger the AP for that cell or zone to limit its use of AMPDU/AMSDU aggregation for that client.

Figure 7:
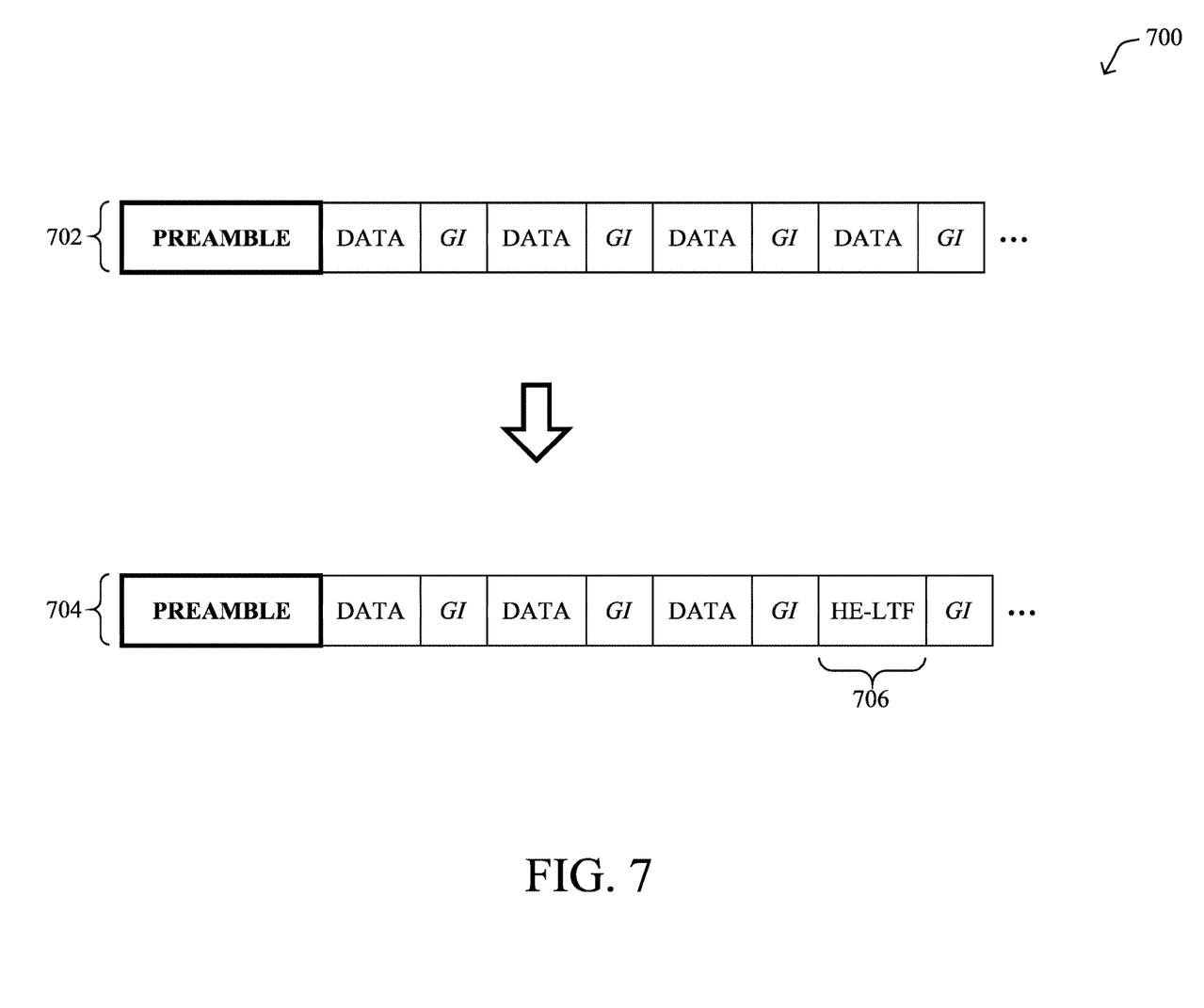
FIG. 7 illustrates an example of the addition of a midamble into a wireless communication.

In another embodiment, mitigation module 406 may cause midambles to be inserted into the communications between the AP and the mobile client, to strengthen the exchange and limit the loss. FIG. 7 illustrates an example 700 of the insertion of a midamble into a wireless communication, according to various embodiments. As shown, example 700 shows a typical communication 702 that may be sent between an AP and a mobile client, comprising a preamble and data fields that are separated by guard intervals (GIs). On determining that a degradation is likely to occur as the client nears the AP, a midable 706 may be inserted into wireless communication 704 between the AP and the mobile client. For instance, midamble 706 may typically take the form of an inserted high efficiency-long training field (HE-LFT), as found in the Wi-Fi 6 standard. Doing so can help to mitigate against the potential degradation due to the fast movement of the client. As would be appreciated, midambles are typically used only when a client is far away from the AP and/or statically in poor radio frequency (RF) conditions, not when the client is approaching the AP.

Figure 8:
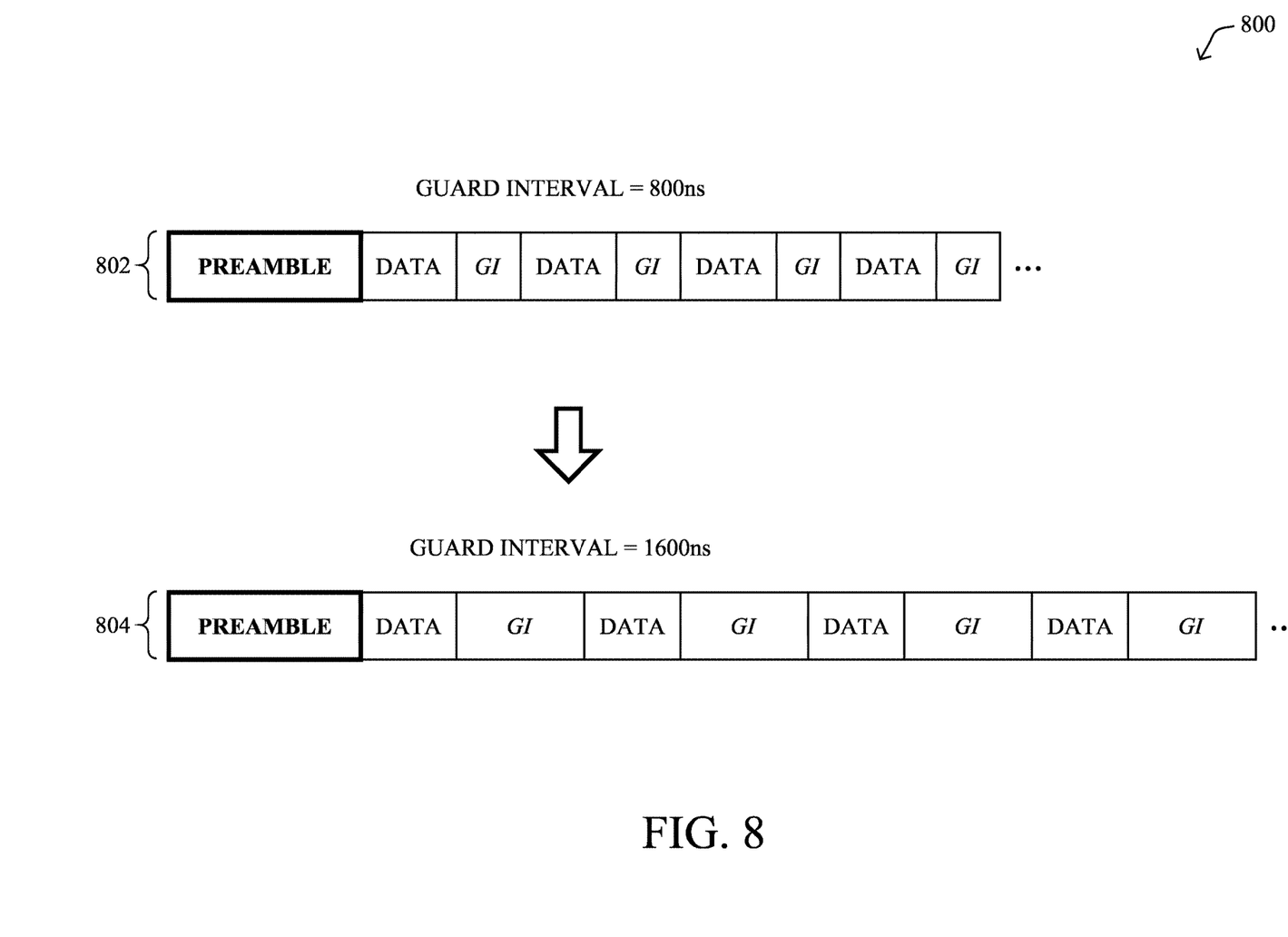
FIG. 8 illustrates an example of the adjusting of a guard interval in a wireless communication.

In a further embodiment, mitigation module 406 may generate an adjustment 410 that adjusts the guard intervals (GIs) in the communications between the AP and the mobile client. As the client nears the AP, the signal reflections are likely strong, but near, thus causing all reflections to hit the client at a short interval. Thus, when the client is near the AP, the GI may be reduced. Then, the GI may be increased as the client moves farther away from the AP to a location at which the signal reflections and echoes have longer distances to travel. FIG. 8 illustrates an example 800 of such an adjustment. As the client nears the AP, a communication 802 is sent between the AP and the client that uses a reduced/adjusted GI of 800 nanoseconds (ns). In turn, as the client moves farther away from the AP, the GI may be increased/adjusted to 1600 ns, as in communication 804.

As would be appreciated, a typical client will not initially know to take mitigation actions determined by an AP, a controller for the AP, or another device in communication with the AP. In such cases, the AP may provide information regarding adjustment(s) 406 to the client. For instance, the AP may indicate to the client that midamble insertions, GI adjustments, or the like, should be used by the client that is approaching the AP.

In another embodiment, another potential adjustment 410 by mitigation module 406 may be to initiate use of an adapted rate shifting algorithm on the AP and/or the client. More specifically, instead of using classical schemes like Minstrel or MiRA, mitigation module 406 may deploy a profile that adapts the rate scheme of the communications to the RF conditions of the area (e.g., fixed top two rates, controlled retry window, etc.). This may be done either in advance or shared dynamically with the client as it moves within proximity of the AP. In some embodiments, the client can also be instructed to use the rate shifting algorithm, proactively. Under normal situations, a client may initiate a rate change in response to a transmission failure. However, with a fast-moving client, such an approach may already be too late.

According to further embodiments, combinations of the above adjustments could also be leveraged to mitigate against any degradation as a client approaches an AP. For instance, an AP and/or client may leverage FTM ranging, midambles, longer or shorter GIs, and/or rate adaptation, depending on the location and motion of the client relative to the AP.

Figure 9:
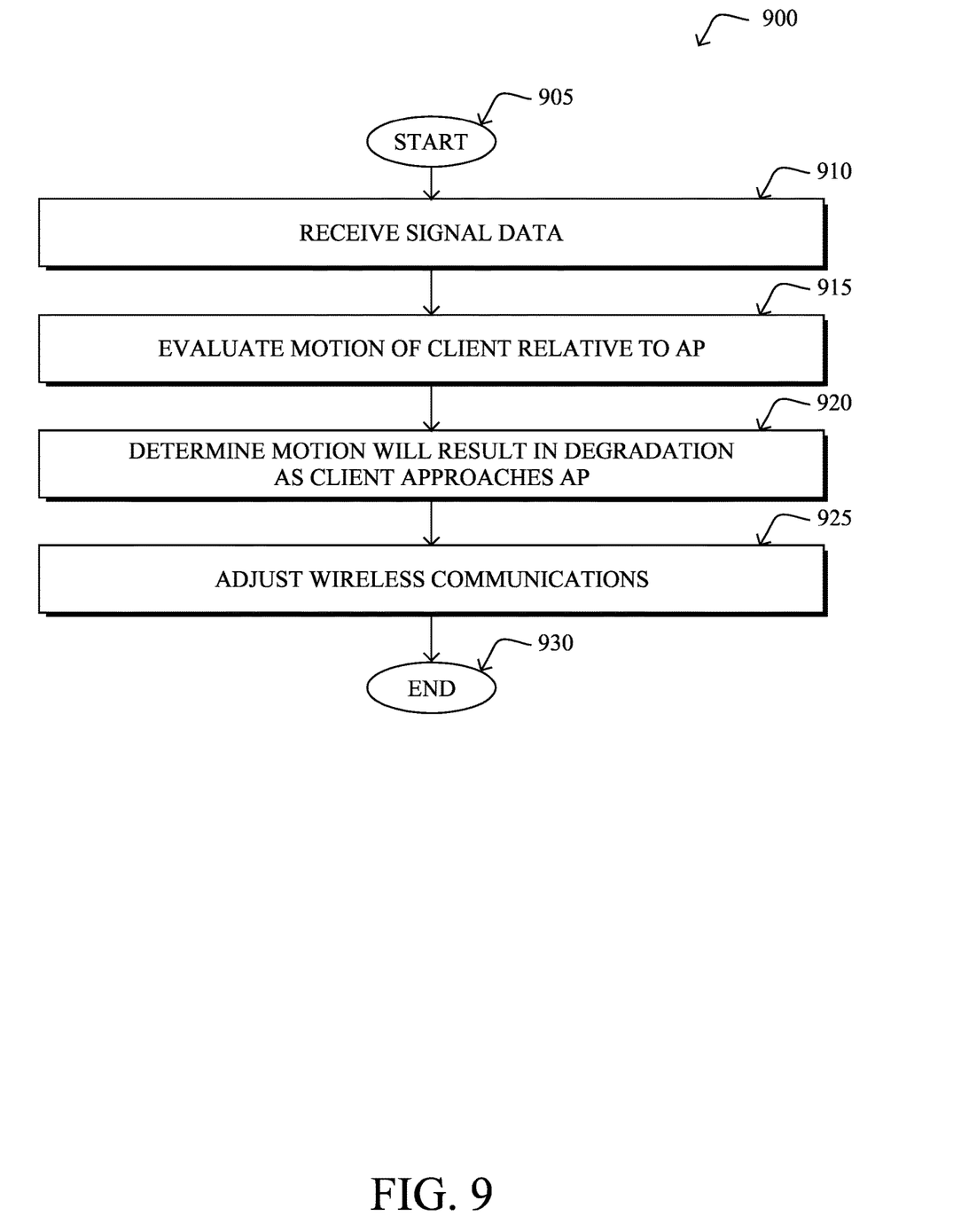
FIG. 9 illustrates an example simplified procedure for improving channel estimations for fast-moving clients.

FIG. 9 illustrates an example simplified procedure for improving channel estimations for fast-moving clients, in accordance with one or more embodiments described herein. In various embodiments, a non-generic, specifically configured device (e.g., device 200), such as an AP, controller for an AP, client, or other device in communication therewith, may perform procedure 900 by executing stored instructions (e.g., process 248). The procedure 900 may start at step 905, and continues to step 910, where, as described in greater detail above, the device may receive data regarding wireless communications between a wireless AP and a client. In general, the data regarding the wireless communications may include information that can be used by the device to determine motion of the client relative to the AP. For instance, the data regarding the communications may include RSSI information, FTM ranging information, or the like.

At step 915, as detailed above, the device may evaluate motion of the client relative to the AP, based on the received data regarding the communications between the AP and the client. For instance, the device may estimate the current location of the client relative to the AP, the velocity of the client, the direction of travel of the client, or the like, based on the received data. For instance, if the received data includes FTM ranging information, the device may use this information to determine the range between the AP and the client over time. In further cases, an increasing RSSI may indicate that the client is approaching the AP or, conversely, a decreasing RSSI may indicate that the client is moving away from the AP.

At step 920, the device may make a determination that the motion of the client relative to the AP will result in the wireless communications degrading as the client approaches the wireless access point, based on the motion of the client relative to the AP, as described in greater detail above. Indeed, as noted previously, there are certain situations in which the high-speed motion of a client can cause the channel estimates to become stale and/or ISI to occur, thereby degrading the communications between the AP and the client. In some embodiments, the device may use a machine learning model to classify the motion of the client as likely to result in the wireless communications degrading as the client approaches the wireless access point. Such a model, for instance, may assess any correlation between the RSSI of the client and the throughput of the communications. In further cases, the model may also take into account the identity of the client (e.g., if the client has been flagged as being susceptible to the degradation condition, etc.), paths of travel associated with the client, or the like.

At step 925, as detailed above, the device may adjust the wireless communications, based on the determination that the motion of the client relative to the AP will result in the wireless communications degrading as the client approaches the wireless access point. In various embodiments, the device may do so by adjusting the use of midambles in the wireless communications, adjusting use of AMPDU or AMSDU aggregation, or adjusting a guard interval used in the wireless communications. In further embodiments, the device may adjust a rate of the wireless communications. In some cases, the device may even cause the client to proactively adjust the rate, based on its motion relative to the AP (e.g., such as when the client enters a certain area, etc.). Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce detection and adjustment approaches that can be used to alleviate and/or avoid situations in which the communications between a mobile client and an AP may degrade as the client approaches the AP. This is particularly of value to deployments in which there are fast-moving mobile clients, such as in mines, train tracks, roadways, and the like.

While there have been shown and described illustrative embodiments for addressing channel mis-estimations in rapidly changing multipath channels, it is to be understood that various other adaptations and modifications may be made within the intent and scope of the embodiments herein. For example, while certain wireless protocols are described herein, such as Wi-Fi, the techniques herein are not limited as such and can be applied to any number of wireless technologies. Further, while certain types of mobile clients are described herein, such as moving vehicles, mine carts, lifts, and the like, the techniques are agnostic to the type of client and can be applied to any number of different types of clients.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   receiving, at a device, data regarding wireless communications between a wireless access point and a client;
   evaluating, by the device and based on the data, motion of the client relative to the wireless access point;
   making, by the device and based on the motion of the client relative to the wireless access point, a determination that a channel estimation for the client at a beginning of a physical layer protocol data unit (PPDU) will no longer be valid by an end of the PPDU as the client approaches the wireless access point; and
   adjusting, by the device, the wireless communications, based on the determination that the channel estimation for the client at the beginning of the PPDU will no longer be valid by the end of the PPDU as the client approaches the wireless access point.

2. The method as in claim 1, wherein the device comprises the wireless access point or a controller for the wireless access point.

3. The method as in claim 1, wherein making the determination that the channel estimation for the client at the beginning of the PPDU will no longer be valid by the end of the PPDU as the client approaches the wireless access point comprises:

using a machine learning model to classify the motion of the client as likely to result in the wireless communications degrading as the client approaches the wireless access point.

4. The method as in claim 1, wherein evaluating, by the device and based on the data, motion of the client relative to the wireless access point comprises:

computing ranges between the wireless access point and the client using Fine Time Measurement (FTM) ranging information in the data regarding wireless communications between the wireless access point and the client.

5. The method as in claim 1, wherein adjusting the wireless communications between the wireless access point and the client comprises:

adjusting a rate of the wireless communications between the wireless access point and the client.

6. The method as in claim 5, wherein adjusting the rate of the wireless communications comprises:

causing the client to proactively adjust the rate, based on its motion relative to the wireless access point.

7. The method as in claim 1, wherein adjusting the wireless communications between the wireless access point and the client comprises:

adjusting use of midambles in the wireless communications between the wireless access point and the client.

8. The method as in claim 1, wherein adjusting the wireless communications between the wireless access point and the client comprises:

adjusting use of aggregated media access control protocol data unit (AMPDU) aggregation or aggregated media access control service data unit (AMSDU) aggregation for the wireless communications.

9. The method as in claim 1, wherein adjusting the wireless communications between the wireless access point and the client comprises:

adjusting a guard interval used in the wireless communications between the wireless access point and the client.

10. The method as in claim 1, wherein the data regarding wireless communications between the wireless access point and the client comprise received signal strength indicator (RSSI) information.

11. An apparatus, comprising:
one or more interfaces;
a processor coupled to the one or more interfaces and configured to execute one or more processes; and
a memory configured to store a process that is executable by the processor, the process when executed configured to:
receive data regarding wireless communications between a wireless access point and a client;
evaluate, based on the data, motion of the client relative to the wireless access point;
make, based on the motion of the client relative to the wireless access point, a determination that a channel estimation for the client at a beginning of a physical layer protocol data unit (PPDU) will no longer be valid by an end of the PPDU as the client approaches the wireless access point; and
adjust the wireless communications, based on the determination that the channel estimation for the client at the beginning of the PPDU will no longer be valid by the end of the PPDU as the client approaches the wireless access point.

12. The apparatus as in claim 11, wherein the apparatus comprises the wireless access point or a controller for the wireless access point.

13. The apparatus as in claim 11, wherein the processor makes the determination that the channel estimation for the client at the beginning of the PPDU will no longer be valid by the end of the PPDU as the client approaches the wireless access point by:

using a machine learning model to classify the motion of the client as likely to result in the wireless communications degrading as the client approaches the wireless access point.

14. The apparatus as in claim 11, wherein the processor evaluates, based on the data, motion of the client relative to the wireless access point by:

computing ranges between the wireless access point and the client using Fine Time Measurement (FTM) ranging information in the data regarding wireless communications between the wireless access point and the client.

15. The apparatus as in claim 11, wherein the processor adjusts the wireless communications between the wireless access point and the client by:

adjusting a rate of the wireless communications between the wireless access point and the client.

16. The apparatus as in claim 15, wherein the processor adjusts the rate of the wireless communications by:

causing the client to proactively adjust the rate, based on its motion relative to the wireless access point.

17. The apparatus as in claim 11, wherein the processor adjusts the wireless communications between the wireless access point and the client by:

adjusting use of midambles in the wireless communications between the wireless access point and the client.

18. The apparatus as in claim 11, wherein the processor adjusts the wireless communications between the wireless access point and the client by:

adjusting use of aggregated media access control protocol data unit (AMPDU) aggregation or aggregated media access control service data unit (AMSDU) aggregation for the wireless communications.

19. The apparatus as in claim 11, wherein the processor adjusts the wireless communications between the wireless access point and the client by:

adjusting a guard interval used in the wireless communications between the wireless access point and the client.

20. A tangible, non-transitory, computer-readable medium storing program instructions that cause a device to execute a process comprising:

receiving, at the device, data regarding wireless communications between a wireless access point and a client;
evaluating, by the device and based on the data, motion of the client relative to the wireless access point;
making, by the device and based on the motion of the client relative to the wireless access point, a determination that a channel estimation for the client at a beginning of a physical layer protocol data unit (PPDU) will no longer be valid by an end of the PPDU as the client approaches the wireless access point; and
adjusting, by the device, the wireless communications, based on the determination that the channel estimation for the client at a beginning of a physical layer protocol data unit (PPDU) will no longer be valid by an end of the PPDU as the client approaches the wireless access point.

* * * * *